April 1, 1969  G. N. CARLSON  3,435,550
ANIMATED DUCK DECOY
Filed Aug. 11, 1967
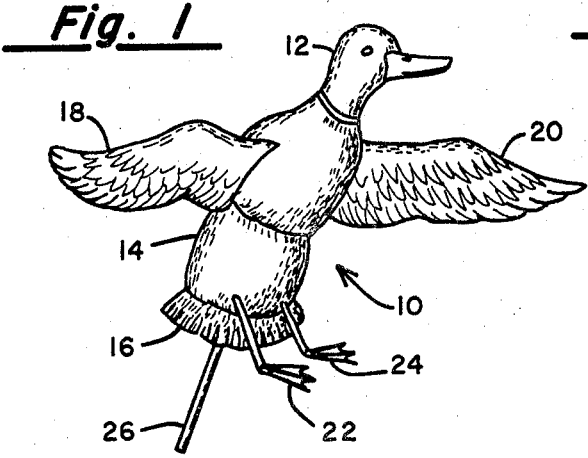
Fig. 1
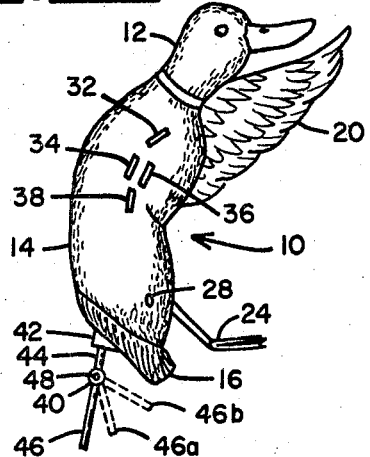
Fig. 2
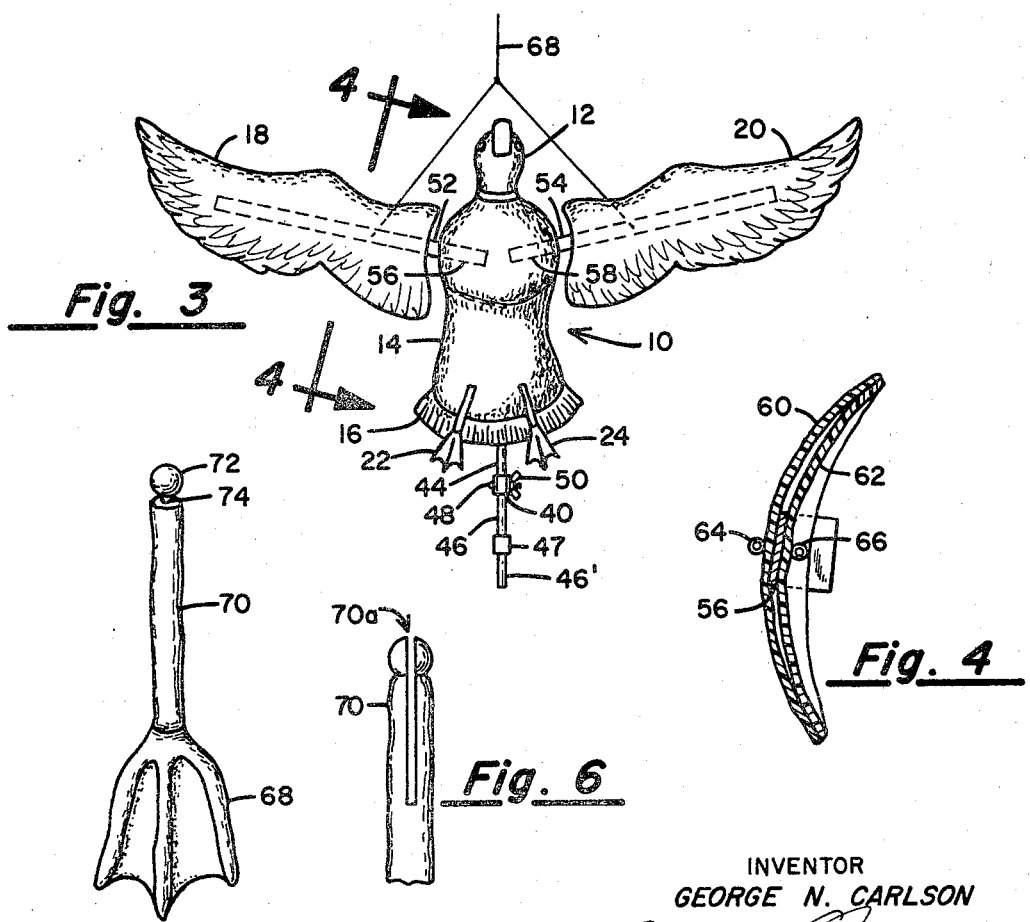
Fig. 3
Fig. 4
Fig. 5
Fig. 6
INVENTOR
GEORGE N. CARLSON
BY *Charles A. Johnson*
ATTORNEY United States Patent Office 3,435,550
Patented Apr. 1, 1969

3,435,550
ANIMATED DUCK DECOY
George N. Carlson, 7225 Kentucky Ave. N.,
Minneapolis, Minn. 55428
Filed Aug. 11, 1967, Ser. No. 659,942
Int. Cl. A01m 31/06
U.S. Cl. 43—3     10 Claims

ABSTRACT OF THE DISCLOSURE

A duck decoy formed with an arched body, cupped wings and a fanned tail. A spring member is secured to each wing and has a projecting portion selectively received in one of a plurality of body apertures. The decoy is held in a simulated landing position by a support including a swivel mounted in the tail, and shaft sections joined by an adjustable hinge. The body is provided with removable legs and a cord may be connected to the wings for actuating the same.

BACKGROUND OF THE INVENTION

Field of the invention

This invention relates generally to the field of structures that are utilized to decoy game fowl close to a hunter or other observer. More particularly it relates to the field of animated decoys.

Description of the prior art

The prior art is replete with duck decoys that float on the water for simulating ducks sitting on the water. The purpose of the decoy, as is well known, is to impart a sense of security to flying ducks and thereby induce them to approach close to the hunter or observer. Various decoys of the floating variety have been equipped with devices simulating duck sounds that are usual when ducks feed. Further, decoys of the prior art have provided movements for simulating a diving duck, movement of the head, movement of the bill, and movement of the wings. Characteristically, these prior art animated decoys have been complex in structure, often including arrangements of gears, levers, pneumatic activations systems, and even electrical activations systems.

It is also well known that weather conditions that often prevail when duck decoys are utilized may include rain or sleet, freezing temperatures, and gusty winds. Under such inclement weather conditions the rather complex structures of prior art devices tend to be unreliable in operation.

Of course intricate gear and lever assemblies for providing animation, along with various mechanical systems for actuating the mechanisms are expensive to manufacture. Further, the interacting parts are susceptible to damage when handled or stored.

Since the purpose of a decoy is to induce a sense of security in flying ducks, it has been found that an animated decoy simulating a landing duck, in addition to decoys floating on the water, provides an advantageous result in enhancing the decoying function. The animated decoy simulating a duck landing serves the function of drawing attention of flying ducks and gives the appearance of a safe landing place.

A primary purpose of this invention, then, is to provide a simple animated duck decoy simulating a landing duck, wherein the shape of the wings and the mounting thereof to the body of the decoy provide animation in response to prevailing breezes. Yet another object of this invention is to provide a simply constructed and inexpensive animated duck decoy that can be easily assembled for use and disassembled for storing. Still another object of this invention is to provide an animated decoy that simulates a landing duck having its wings set in a braking position and adjustable in wing position and body attitude.

These and other more detailed objectives will become fully apparent and be made clear from the appended claims, and from the following detailed description of an illustrative embodiment considered in view of the accompanying drawings.

BRIEF DESCRIPTION OF DRAWINGS

FIGURE 1 is a perspective view of the preferred embodiment of this invention. FIGURE 2 is a side view with one wing and one foot removed to illustrate the various mounting positions for the wing and the mounting arrangement for the foot. FIGURE 3 is a front view of the animated duck decoy of this invention. FIGURE 4 is a cross-section of a wing taken along line 4—4 in FIGURE 3, and illustrates the curved structure which operates to catch the wind to cause the wings to move. FIGURE 5 is a top view of one of the detachable duck feet. FIGURE 6 is a side view of the upper portion of th detachable foot shown in FIGURE 5 and illustrates the spring-receiving slot used for shielding the mounting spring tip when the decoy is stored.

SUMMARY

The decoy of the subject invention comprises a body portion having a pair of apertures for receiving a pair of detachable feet, and including a plurality of wing-positioning apertures on either side of the body. A pair of wing structures are detachably mounted to said body by spring supporting members that co-act with the wing-positioning apertures. The wings are curved in a manner to catch the wind, such that the wind on the wings causes the springs to deflect. Since the wind is seldom absolutely constant, the spring action of the supporting members will cause the wings to tend to return to a rest position, and the decoy will thereby be rendered animated. The mounting structure provides adjustable positioning of the attitude of the decoy.

DESCRIPTION OF THE PREFERRED EMBODIMENT

FIGURE 1 illustrates an embodiment of the subject invention, and includes a body portion 10 shaped generally like the arched body of a duck when landing. The body includes a head 12, the arched body portion 14, and the fanned tail structure 16. A pair of cupped wings, labeled 18 and 20, are flexibly mounted to the sides of the body portion 14. A pair of feet, labeled 22 and 24, are detachably mounted to the lower front part of body portion 14. A mounting member 26 is attached to the underside of the flared tail structure 16.

FIGURE 2 illustrates a side view of the decoy, and illustrates the body 10 with wing 18 and foot 22 removed. This view illustrates the arched shape of body portion 14, this arched shape simulating the shape of a duck's body when the wings are set in a braking position for landing. The feet 22 and 24 are detachably mounted in apertures such as foot-receiving aperture 28. The wings can be selectively set in several positions. The wing-positioning apertures are labeled 32, 34, 36, and 38. For purposes of this illustration, four wing-positioning apertures are shown, but it will be understood fewer may be utilized, or others may be added to give a greater choice of wing positions. The wing positions will be selected in operation to cooperate with the selected attitude of the body 10, in a manner to yield a life-like combination, and to make maximum use of prevailing wind conditions. The selection of the body attitude is accomplished by the setting of hinge structure 40. A swivel 42 is mounted in the underside of tail portion 16, thereby permitting the decoy to be turned into the wind. A connection member 44 is secured in swivel 42 such that the body 10 can swivel around the longitudinal axis of connection member 44, so that the decoy faces into the wind in a realistic manner. The lower end of connection member 44 is coupled to hinge member 40. A stake 46 provided to support the decoy has a lower end which can be set down in the ground under the water. The upper end of stake 46 is coupled to hinge member 40. Hinge member 40 turns about an axis defined by bolt 48 (see FIGURE 3). Bolt 48 has a wing-nut 50 at one end thereof which can be tightened to secure hinge member 40 in a desired fixed position. Dotted outlines 46a and 46b illustrate how the stake position can be altered with regard to the decoy body 10. It can be seen that if stake 46 is placed vertically into the ground, the body attitude can be set from nearly vertical, as illustrated, to very nearly horizontal. Alternatively, a coupling 47 can be fixedly attached to a shortened member 46. This coupling can be a coil spring or other suitable holding device for receiving the upper end of a stake 46'. This allows the user to select the desired length of stake 46' for the depth of water where the decoy is to be used. Stake 46' can often be cut and selected from limbs available in the wild and need not necessarily be stored with the decoy. The pitch of wing-positioning apertures 32, 34, 36, and 38, as they extend into body portion 14, determines whether the wings are forward or substantially straight out from the body; and, whether they are raised above a line through the body or are substantially parallel with a line through the body. These wing-positioning apertures 32, 34, 36, and 38, as they extend into the body are shaped to slidably retain the spring members on the wings.

FIGURE 3 is a front view of the animated decoy of this invention, and each of the elements previously discussed is identified by the corresponding reference numeral. In this view it can be seen that wings 18 and 20 each have mounting springs, identified as 52 and 54 respectively. These mounting springs are substantially rectangular in cross-section (see FIGURE 4) and extend along the length of the wing. The mounting ends extend beyond the inner end of the wing and are arranged to be inserted in a selected one of the wing-positioning apertures. This is illustrated by dotted portions 56 and 58. While these spring ends are illustrated as having smooth edges, it should be understood they can be manufactured with notches to assist in holding the wings in the wing-positioning apertures.

Directing attention to FIGURE 4, the wing structure is shown in cross-section. For this embodiment, the wing is formed from a pair of flexible pieces of material formed into a predetermined curved shape. An outer layer 60 is bonded along the edges to an inner layer 62, with the two layers enclosing spring member 56, and bonded thereto. Preferably the wing material is of a workable material, such as thin plastic sheets, that can be easily formed, as by heating, while retaining a high degree of flexibility. An alternate embodiment for the wing structure can be formed by omitting layer 62, and bonding the spring member 56 to layer 60. Further, the wing can be molded with a spring receiving channel, and the spring member 56 retained therein.

An auxiliary activation mechanism is provided by way of eyelets 64 and 66 on each side of the wings. A thin cord 68 can be coupled either to the back side of the wings, as in FIGURE 3, or on the front side of the wings. In the absence of sufficient breeze to activate the wings, the cord 68 can be pulled and relaxed by the hunter from a blind in a manner to simulate the natural wing movement of a duck landing. The action of mounting springs 52 and 54 will cause the wings to return to the relaxed position, when tension on cord 68 is removed. The user can choose whether he desires the decoy to face him, or face away from him by the selection of eyelets 64 or 66.

FIGURE 5 illustrates the structure of feet 22 and 24.

A raised foot portion 68 is shaped like a duck's foot braced for landing, and is integrally formed to one end of a leg portion 70. The other end of leg 70 is terminated with mounting ball 72. Ball 72 is adapted to be fit into foot-receiving aperture 28, thereby detachably mounting the foot to body portion 14. Foot-receiving aperture 28 is of a slightly smaller diameter than the diameter of ball 72, such that the wall of aperture 28 engages the neck portion 74 of the foot structure.

FIGURE 6 illustrates a side view of the upper portion of the leg illustrated in FIGURE 5. The upper portion of leg 70 is provided with slot 70a for a predetermined distance. Slot 70a is utilized when the decoy is stored, to receive the mounting end, such as portion 56 in FIGURE 3, thereby forming a protective shield. Each decoy leg 22 and 24 is similarly formed, and arranged to cooperate with one of the wings.

Body 10 of the decoy can be formed of plastic material by a molding process well known in the art, thereby providing a durable yet inexpensive manufactured item. Various details, such as feather coloring, eyes, bill, etc., of body 10, can be painted on the surface thereof, as can the detail of wings and feet, thereby yielding a lifelike appearing decoy.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention.

What is claimed:

1. An animated decoy comprising: a body member simulating a landing fowl and having a head portion, a fanned tail portion, and an arched body portion, said arched body portion including a plurality of wing-positioning apertures in the sides thereof for defining a plurality of wing positions; and a pair of cupped wing members simulating wings of a fowl set for landing, each of said wing members having an inner and an outer end and each including a resilient mounting spring extending beyond said inner end for slidably engaging a selected one of said wing-positioning apertures, said resilient mounting springs being capable of being deflected by wind currents for providing life-like wing action.

2. A decoy as in claim 1 wherein said body member further includes a swivel means mounted in said fanned tail portion; and stake means having a longitudinal axis, said stake means being coupled to said swivel means for supporting said decoy in a predetermined position, said swivel means permitting said body member to turn about said axis for facing said wind currents.

3. A decoy as in claim 2 and further including hinge means comprising upper and lower members pivotally coupled about a hinge axis transverse said longitudinal axis, and including positioning means for locking said upper and lower hinge members in predetermined adjustable positions, said upper hinge member being coupled to said swivel means and said lower hinge member being coupled to said stage means, and said predetermined adjustable positions defining selected attitudes of said body member.

4. A decoy as in claim 3 and further including a stake-receiving coupling means connected to said lower hinge member for receiving the upper end of a stake of selectively alterable length.

5. A decoy as in claim 1 wherein said arched body portion includes a pair of leg-receiving apertures in the front side thereof, and a pair of leg members, each of said leg members including a leg portion having first and second ends, a foot portion coupled to said first end, and a mounting ball coupled to said second end, each of said mounting balls being adapted to slidably engage an associated one of said leg-receiving apertures for removably mounting said leg member to said body member.

6. A decoy as in claim 1 wherein each of said cupped wing members includes a wing-shaped layer of resilient material having forward and rearward surfaces, said resilient material being adapted for movement in response to said wind currents impinging on one of said surfaces; and said resilient mounting spring is substantially rectangular in cross-section and includes a first portion extending along the length of said layer and a second portion extending beyond said inner end of said layer for slidably engaging a selected one of said wing-positioning apertures; and mounting means for coupling said first portion to said forward surface of said layer.

7. A decoy as in claim 6 and further including an additional layer of resilient material having forward and rearward surfaces, said rearward surface of said additional layer bonded in a cooperative position to said forward surface of said wing-shaped layer for enclosing said first portion of said resilient spring member therebetween.

8. A decoy as in claim 1 wherein each of said cupped wing members are formed from a resilient synthetic material in the shape of a fowl's wing set for landing, said formed member including a channel extending along a portion of the length thereof and opening at said inner end of said wing member; and said resilient mounting spring including a first portion for extending into said channel and a second portion extending external to said inner end for slidably engaging a selected one of said wing-positioning apertures.

9. A decoy as in claim 1 and further including auxiliary animation means comprising an elongated cord having first and second ends; coupling means for coupling said first end to a like surface of each of said cupped wing members in a manner such that when said second end alternately has force applied thereto and released, the resilient action of said mounting springs causes said wing members to move in a lifelike manner for the landing.

10. A decoy as in claim 9 wherein said auxiliary animation means includes a first pair of eyelets, each of said first pair of eyelets coupled to the front surface of respectively associated ones of said wing members, said first end of said elongated cord coupled to said first pair of eyelets for activating said wing members from the front of said decoy; and a second pair of eyelets coupled to the rear surface of respectively associated ones of said wing members, said first end of said elongated cord alternatively coupled to said second pair of eyelets for activating said wing members from the rear of said decoy.

References Cited

UNITED STATES PATENTS

| | | | |
|---|---|---|---|
| 74,458 | 2/1868 | Wales | 43—3 |
| 2,028,849 | 1/1936 | Shay | 43—3 |
| 2,663,108 | 12/1953 | Dixon et al. | 43—3 |

WARNER H. CAMP, *Primary Examiner.*